(12) United States Patent
Reynhout

(10) Patent No.: US 7,807,602 B2
(45) Date of Patent: Oct. 5, 2010

(54) PROCESS FOR HYDROCARBON SYNTHESIS

(75) Inventor: Marinus Johannes Reynhout, Amsterdam (NL)

(73) Assignee: Shell Oil Company, Houston, TX (US)

( * ) Notice: Subject to any disclaimer, the term of this patent is extended or adjusted under 35 U.S.C. 154(b) by 104 days.

(21) Appl. No.: 11/943,401

(22) Filed: Nov. 20, 2007

(65) Prior Publication Data

US 2008/0132589 A1 Jun. 5, 2008

(30) Foreign Application Priority Data

Nov. 22, 2006 (EP) .................. 06124544

(51) Int. Cl.
*B01J 23/00* (2006.01)
*B01J 21/00* (2006.01)
*B01J 20/00* (2006.01)

(52) U.S. Cl. ............. 502/326; 502/324; 502/327; 502/349; 502/350; 502/355; 502/415; 502/439

(58) Field of Classification Search ............. 502/324, 502/326, 327, 349, 350, 355, 415, 439
See application file for complete search history.

(56) References Cited

U.S. PATENT DOCUMENTS

| | | | | |
|---|---|---|---|---|
| 3,857,901 A | | 12/1974 | Dowden et al. ......... 260/668 A |
| 3,903,242 A | * | 9/1975 | Meissner et al. ............. 502/324 |
| 4,396,539 A | | 8/1983 | Sapienza et al. ......... 252/455 R |
| 4,409,131 A | | 10/1983 | Fetchin ....................... 502/263 |
| 4,595,703 A | | 6/1986 | Payne et al. ................. 518/715 |
| 4,793,797 A | * | 12/1988 | Kato et al. ....................... 431/7 |
| 5,087,791 A | | 2/1992 | Magistro ................... 585/657 |
| 5,502,019 A | | 3/1996 | Augustine et al. ............ 502/314 |
| 5,759,229 A | * | 6/1998 | Feitler ............................ 75/352 |
| 5,783,604 A | | 7/1998 | Garcia Nunez ............ 514/627 |
| 5,783,607 A | | 7/1998 | Chaumette et al. .......... 518/713 |
| 5,840,649 A | * | 11/1998 | Ichiki et al. ................. 502/324 |
| 5,863,856 A | | 1/1999 | Mauldin ..................... 502/325 |
| 5,972,829 A | * | 10/1999 | Ichimura ..................... 502/303 |
| 5,981,608 A | * | 11/1999 | Geerlings et al. ............ 518/715 |
| 6,130,184 A | * | 10/2000 | Geerlings et al. ............ 502/350 |
| 6,221,804 B1 | * | 4/2001 | Yamada et al. .............. 502/326 |
| 6,521,565 B1 | * | 2/2003 | Clavenna et al. ............ 502/325 |
| 6,680,036 B1 | * | 1/2004 | Fisher et al. ............. 423/213.2 |
| 6,977,237 B2 | * | 12/2005 | Geerlings et al. ............ 502/326 |
| 7,172,990 B2 | * | 2/2007 | Geyer et al. ................. 502/326 |
| 7,361,619 B2 | * | 4/2008 | Malek et al. ................... 502/20 |
| 7,402,612 B2 | * | 7/2008 | Jin et al. ...................... 518/713 |
| 7,419,928 B2 | * | 9/2008 | Malek et al. ................... 502/20 |
| 7,518,023 B2 | * | 4/2009 | Geyer et al. ................. 585/250 |
| 2002/0025907 A1 | * | 2/2002 | Xu et al. ..................... 502/324 |
| 2002/0131915 A1 | * | 9/2002 | Shore et al. ................. 422/177 |

FOREIGN PATENT DOCUMENTS

| | | |
|---|---|---|
| CA | 1166655 | 5/1984 |
| EP | 446035 | 9/1991 |
| WO | WO9700231 | 1/1997 |
| WO | WO0176734 | 10/2001 |
| WO | WO02/20439 | 3/2002 |

\* cited by examiner

*Primary Examiner*—Cam N Nguyen

(57) ABSTRACT

A method for the preparation of a catalyst or catalyst precursor comprising: (a) admixing a carrier material, a homogeneous crystalline solid solution of a cobalt compound and one or more d-metal compounds and/or one or more co-catalysts or precursors thereof, and optionally a liquid; (b) forming the mixture of step (a); and (c) optionally drying and/or calcining the product of step (b).

10 Claims, 3 Drawing Sheets

PROCESS FOR HYDROCARBON SYNTHESIS

This application claims the benefit of European Application No. 06124544.5 filed Nov. 22, 2006, which is incorporated herein by reference.

BACKGROUND

The present invention relates to a method for the preparation of a catalyst or catalyst precursor, the catalyst or catalyst precursor obtainable by the method, and to the use of such catalyst in a process for producing normally gaseous, normally liquid and optionally solid hydrocarbons from synthesis gas generally provided from a hydrocarbonaceous feed, for example a Fischer-Tropsch process.

Many documents are known describing processes for the catalytic conversion of (gaseous) hydrocarbonaceous feedstocks, especially methane, natural gas and/or associated gas, into liquid products, especially methanol and liquid hydrocarbons, particularly paraffinic hydrocarbons. In this respect often reference is made to remote locations and/or off-shore locations, where direct use of the gas, e.g. through a pipeline or in the form of liquefied natural gas, is not always practical. This holds even more in the case of relatively small gas production rates and/or fields. Reinjection of gas will add to the costs of oil production, and may, in the case of associated gas, result in undesired effects on the crude oil production. Burning of associated gas has become an undesired option in view of depletion of hydrocarbon sources and air pollution.

The Fischer-Tropsch process can be used as part of the conversion of hydrocarbonaceous feed stocks into liquid and/or solid hydrocarbons. Generally the feed stock (e.g. natural gas, associates gas and/or coal-bed methane, coal) is converted in a first step into a mixture of hydrogen and carbon monoxide (this mixture is often referred to as synthesis gas or syngas). The synthesis gas is then fed into a reactor where it is converted in one or more steps over a suitable catalyst at elevated temperature and pressure into compounds ranging from methane to high molecular weight modules comprising up to 200 carbon atoms, or, under particular circumstances, even more, (and water).

Catalysts used in the Fischer-Tropsch synthesis often comprise a carrier based support material and one or more metals from Group VIII of the Periodic Table, especially from the cobalt or iron groups, optionally in combination with one or more metal oxides and/or metals as promoters selected from zirconium, titanium, chromium, vanadium and manganese, especially manganese. Such catalysts are known in the art and have been described for example, in the specifications of WO 9700231A and U.S. Pat. No. 4,595,703.

Catalysts can be prepared by obtaining a metal hydroxide, carefully oxidising it to the metal oxide and then placing it in the appropriate reactor where it is reduced to the metal in situ.

One catalyst for Fischer-Tropsch reactions is cobalt in titania. In one way to prepare the catalyst, cobalt hydroxide ($Co(OH)_2$) can be used as a starting material. This material is dried, calcined and then decomposed to form cobalt oxide (CoO). It is then impregnated onto a support, for example titania. The cobalt is further oxidized ($CO_3O_4$) and then placed in a Fischer-Tropsch reactor. In the reactor the cobalt oxide is reduced to cobalt.

Hitherto, there has been no consideration of control over the combination of the catalyst metal such as cobalt, and a promoter(s). Thus, the present combinations made have a relatively wide variation of concentrations of the constituents in each unit or crystal of catalyst formed. Such varied material therefore requires a wide variation in the conditions, especially temperature, for reduction of the (precursor) catalyst material to provide the elemental cobalt on the support carrier. But, a wide variation in reduction conditions also leads to some catalyst forming other (unwanted) species, e.g. cobalt titanate, which cannot catalyze and is therefore unproductive. To avoid such unwanted species, it has been preferable to minimize the variation in reduction conditions, even though at least some of the catalyst or catalyst precursor will not become activated. The loss of potential activity is currently accepted as necessary wastage in the art.

However, control of the co-formation of the, for example, cobalt and a promoter(s) would enable a more controlled reduction activation process. This would lead to a decrease in the wastage of cobalt that is not suitably transformed into elemental cobalt. That is, an increase in the amount of catalyst material that is properly formed and activated, hence an increase in the efficiency of the catalyst material per volume of support carrier, and hence, in many ways, an increase in the efficiency and production of the overall process and reactor.

SUMMARY OF THE INVENTION

According to one aspect of the present invention, there is provided a method for the preparation of a catalyst or catalyst precursor comprising:
(a) admixing:
  (i) a carrier material;
  (ii) a crystalline solid solution of a cobalt compound and one or more d-metal compounds and optionally one or more co-catalysts or precursors thereof; and
  (iii) optionally a liquid;
(b) forming the mixture of step (a); and
(c) optionally drying and/or calcining the product of step (b), whereby 90% or more of the crystals in the crystalline solid solution comprises 1 to 10 wt %, preferably 3 to 7 wt %, more preferably 4 to 6 wt % of d-metal, calculated on the total weight of d-metal atoms and cobalt atoms per single crystal.

According to another aspect of the present invention, there is provided a catalyst or catalyst precursor obtainable by a method according to the present invention. According to even another aspect of the present invention, there is provided the use of a catalyst according to the present invention in a process for producing normally gaseous, normally liquid and optionally solid hydrocarbons from synthesis gas generally provided from a hydrocarbonaceous feed, for example a Fischer-Tropsch process.

DETAILED DESCRIPTION OF THE INVENTION

Figure 1:
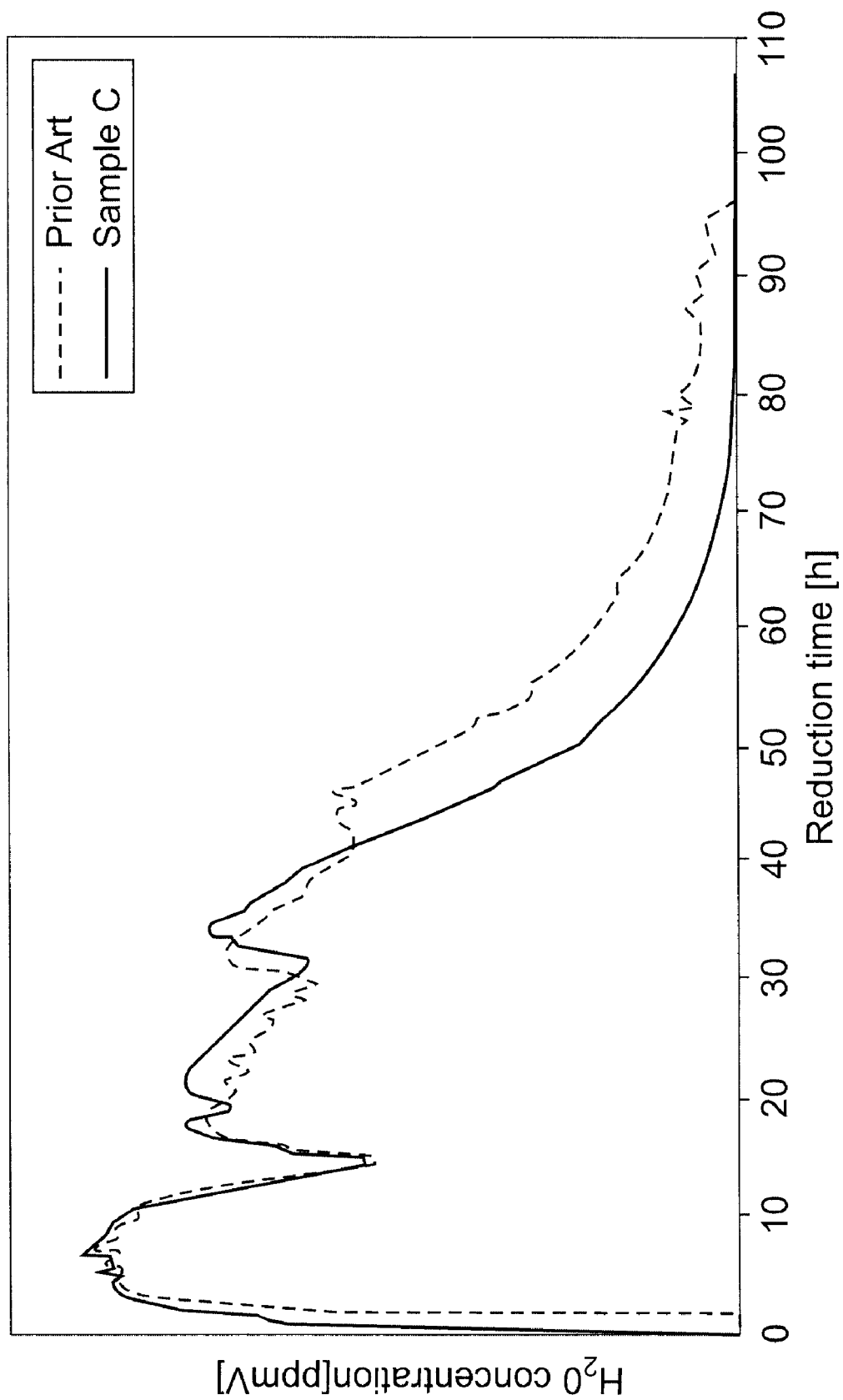
FIG. 1 is a graphical representation of the activation of a prior art catalyst and a catalyst according to an embodiment of the invention.

A crystalline solid solution is defined as a solid-state solution of one or more solutes in a solvent, whereby the crystal structure of the solvent remains practically unchanged by the addition of the solutes, and whereby the mixture remains in a single homogeneous phase. The X-ray diffraction pattern of a crystalline solid solution is characteristic of the diffraction pattern of the host lattice. In this case, a number of the cobalt cations are replaced by d-metal cations. Such d-metal cations are thus substituted for host lattice ions.

By using a solid solution of which 90% or more of the crystals comprises 1 to 10 wt %, preferably 3 to 7 wt %, more preferably 4 to 6 wt % of d-metal, calculated on the total weight of d-metal atoms and cobalt atoms per single crystal, there is a significant reduction in the variation of the ratio of the promoter(s)/co-catalyst(s), and the Group VIII metal(s). The variation of concentrations of the promoter(s)/co-catalyst(s), and the Group VIII metal(s) in each unit or crystal of catalyst or catalyst precursor formed is significantly reduced. With reduction in the ratio variation in the (precursor) catalyst material, there is a significant reduction in the variation of conditions needed to activate the catalyst or catalyst precursor, especially temperature and time. Thus, there is a significant increase in the amount of catalyst or catalyst precursor which is properly activated, and so a significant reduction in the amount that is not properly activated.

Improved activation provides (a) better catalytic activity in use, and (b) improved $C_5+$ selectivity; that is, less methane and $C_{2-4}$ hydrocarbons, and less carbon dioxide produced.

The formation of a crystalline solid solution, generally being a single phase which has a composition between two end member ratios, is known in the art. Crystalline solid solutions can, for example, be made by means of co-precipitation. As a specific example of co-precipitation can be mentioned a method in which a relatively large amount of cobalt ions and a relatively small amount of manganese ions are dissolved in a liquid, e.g. water, followed by increasing the pH so that hydroxides precipitate. The obtained solid solution has a crystal structure like cobalt hydroxide with some cobalt ions being replaced by manganese ions.

Preferably the crystalline solid solution used in a method according to the present invention is in the form of a hydroxide, carbonate, acetate, citrate, nitrate, oxyhydroxide or oxide, preferably hydroxide.

In a preferred embodiment the crystalline solid solution is a crystalline solid solution in which 90% or more, preferably 95% or more, such as 96%, 97% or even 98%, of the solid solution is within a standard deviation of 3, 2, or less, preferably within 1, more preferably less than 1 such as 0.9, 0.8 or 0.7, from the mean solid solution value. The mean solid solution value can be determined, for example, by means of bulk chemical analysis methods, for example with induction coupled plasma (ICP), X-ray fluorescence (XRF), wet chemistry, or with Energy Disperse X-Ray (EDX) using a wide radiation bundle so that more than 100, preferably more than 1000 crystals are analysed per measurement.

In a preferred embodiment the crystalline solid solution is a crystalline solid solution in which 90% or more, preferably 95% or more, such as 96%, 97% or even 98%, of the solid solution is within +40%, preferably 30%, more preferably 20% and even more preferably 10 or even 5%, of the mean elemental weight of each component. Preferably, the mean elemental weight is the desired weight of each component in the solid solution.

In a preferred embodiment, the crystalline solid solution comprises a cobalt compound and one or more d-metal compounds, the mean elemental weight of the d-metal(s) being 5 wt %, calculated on the total weight of cobalt and d-metal atoms. In a highly preferred embodiment, the crystalline solid solution comprises a cobalt compound and a manganese compound, the mean elemental weight of manganese being 5 wt %, calculated on the total weight of cobalt and manganese atoms.

In a preferred embodiment at least a substantial majority of the crystals in the crystalline solid solution comprise a weight of d-metal at or near 5%, calculated on the total weight of d-metal atoms and cobalt atoms per single crystal.

Physical properties, especially the variation of concentration of the constituents, of a catalyst or catalyst precursor prepared according to the present invention can, for example, be deducted from an elemental weight comparison of the catalyst material on a single particle crystal level. There are various techniques, including EDX (Energy Disperse X-Ray), which can analyse materials at the single particle or crystal level, so as to determine the single particle or crystal compositions. Using TEM (Transmission Electronic Microscopy) a number of crystals can be selected for which the chemical composition is to be determined by EDX. Preferably for at least 10 crystals, more preferably for at least 15 crystals the chemical composition is measured. These measurements can be used to determine the deviation from the mean elemental weight of each component per single crystal.

The standard deviation for the homogeneity is based on the variation of the mass weight of the promoter(s) and/or co-catalyst(s) compared to the mass weight of such material(s) and the Group VIII metal(s) combined. It will be appreciated by those skilled in the art that this is a very exacting standard deviation for the composition at a single particle level of a mixture of substances.

The desired mass weight of the promoter(s) and/or co-catalyst(s) can be set to be a particular or appropriate percentage within the Group VIII metal(s), or is more usually defined as a percentage range, preferably a limited percentage range such as a few percent. Thus, the homogeneity of the homogeneous solid solution can be measured as the percentage of catalyst which falls within that percentage or percentage range.

In a preferred embodiment, the carrier material is a refractory metal oxide or precursor thereof, more preferably a refractory metal oxide, most preferably titania.

The present invention provides use of a catalyst having minimum variation in its composition of two or more components. With minimum variation there is increased activation at a particular temperature, and there is therefore increased catalytic activity and percentage conversion of synthesis gas into desired hydrocarbon products.

The present invention can also provide a catalyst having improved selectivity of desired hydrocarbon products, e.g. $C_5+$, with a complementary reduction in unwanted products such as $CO_2$ and $CH_4$.

Methods of preparing homogeneous solid solutions between two or more compounds and/or elements are known in the art. General methods of preparing catalysts and catalyst precursors are also known in the art, see for example U.S. Pat. Nos. 4,409,131, 5,783,607, 5,502,019, WO 0176734, CA 1166655, U.S. Pat. Nos. 5,863,856 and 5,783,604. These include preparation by co-precipitation and impregnation. Such processes could also include freezing, sudden temperature changing, etc. Control of the component ratio in the solid solution can be provided by parameters such as residence time, temperature control, concentration of each component, etc.

However, it has not hitherto been recognized that the preparation of a catalyst or catalyst precursor can be performed using a crystalline solid solution, let alone that it can have an influence on the variation in activation, and on the amount of properly activated catalyst ready for a process for producing hydrocarbons from synthesis gas.

The process of the present invention is particularly, but not exclusively, a Fischer-Tropsch reaction. Fischer-Tropsch catalysts are known in the art, and as a Group VIII metal component, they preferably use cobalt, iron and/or ruthenium, more preferably cobalt.

References to "Groups" and the Periodic Table as used herein relate to the previous IUPAC version of the Periodic Table of Elements such as that described in the 68th Edition of the Handbook of Chemistry and Physics (CPC Press). This uses the American CAS System.

The Group VIII catalytically active metal may be present with one or more metals or metal oxides as promoters, more particularly one or more d-metals or d-metal oxides.

Suitable metal oxide promoters may be selected from Groups IIA, IIIB, IVB, VB, VIIB, VIIB and VIIIB of the Periodic Table of Elements, or the actinides and lanthanides. In particular, oxides of magnesium, calcium, strontium, barium, scandium, yttrium, lanthanum, cerium, titanium, zirconium, hafnium, thorium, uranium, vanadium, chromium and manganese are most suitable promoters.

Suitable metal promoters may be selected from Groups VIIB or VIII of the (same) Periodic Table. Manganese, iron, rhenium and Group VIII noble metals are particularly suitable, with platinum and palladium being especially preferred. The amount of promoter present in the catalyst is suitably in the range of from 0.01 to 100 pbw, preferably 0.5 to 20, more preferably 1 to 20 pbw, per 100 pbw of carrier.

Suitable co-catalysts include one or more metals such as iron, nickel, or one or more noble metals from Group VIII. Preferred noble metals are platinum, palladium, rhodium, ruthenium, iridium and osmium. Most preferred co-catalysts for use in Fischer Tropsch are iron and/or ruthenium. Most preferred co-catalysts for use in hydro-cracking are those comprising platinum. Such co-catalysts are usually present in small amounts.

A most suitable catalyst comprises cobalt as the catalytically active metal and zirconium as a promoter. Another most suitable catalyst comprises cobalt as the catalytically active metal and manganese and/or vanadium as a promoter.

Any promoter(s) are typically present in an amount of from 0.1 to 60 parts by weight per 100 parts by weight of a carrier material. It will however be appreciated that the optimum amount of promoter(s) may vary for the respective elements which act as promoter(s). If the catalyst comprises cobalt as the catalytically active metal and manganese and/or vanadium as promoter, the cobalt:(manganese+vanadium) atomic ratio is advantageously at least 12:1.

In one embodiment of the present invention, the solid solution comprises the promoter(s) and/or co-catalyst(s) having a concentration in the Group VIII metal(s) in the range 1-10 atom %, preferably 3-7 atom %, and more preferably 4-6 atom %.

In another embodiment of the present invention, the solid solution is in the form of a hydroxide, carbonate, acetate, citrate, nitrate, oxyhydroxide or oxide, preferably hydroxide.

For example, with cobalt as the active component, the cobalt and manganese, or other d-metal or metals as promoter, has the cobalt and manganese present as a solid solution of these metals, with the formula $(Co,Mn)(OH)_2$ if being a hydroxide. In this cobalt compound not only is the amount of manganese fixed to a narrow range in concentration, e.g. 5 wt % Mn on total weight of Co and Mn, but also the amount of the d-metal per individual hydroxide crystal is fixed in a narrow range. This avoids the presence of crystals being poor in manganese, which crystals will be reduced too early, and the presence of crystals rich in manganese that will be reduced too late during activation of the catalyst or catalyst precursor. The invention also relates to other types of (poorly soluble) chemicals in which the promoter/d-metals can form solid solutions, such as $(Co,Mn)(CO_3)$, $(Co,Mn)O(OH)$, $(Co,Mn)O$ and the spinel $(Co,Mn)_3O_4$.

The catalytically active metal is preferably supported on a porous carrier. The porous carrier may be selected from any of the suitable refractory metal oxides or silicates or combinations thereof known in the art. Particular examples of preferred porous carriers include silica, alumina, titania, zirconia, ceria, gallia and mixtures thereof, especially silica and titania.

The optimum amount of catalytically active metal present on a carrier depends inter alia on the specific catalytically active metal. Typically, the amount of cobalt present in the catalyst may range from 1 to 100 parts by weight per 100 parts by weight of carrier material, preferably from 5 to 50 parts by weight per 100 parts by weight of carrier material.

The carrier and solid solution could be admixed in any form or way known, and then formed (or shaped). The admixture may, for example, be extruded, pelletized, or spray-dried. Any forming or shaping process may be used which results in particles that retain the resulting shape during transportation and under reaction conditions. A preferred forming method is extrusion.

When the forming is performed by means of extrusion, typically a liquid is added to the mixture. In that case the liquid is preferably added to the mixture after admixing and before or during extrusion.

The liquid may be any of suitable liquids known in the art, for example: water; ammonia; alcohols, such as methanol, ethanol and propanol; ketones, such as acetone; aldehydes, such as propanol and aromatic solvents, such as toluene, and mixtures of the aforesaid liquids. A most convenient and preferred liquid is water.

The liquid may include viscosity improvers such as polyvinylalcohol.

The catalytically active metal and the promoter(s)/co-catalyst(s), may be deposited on a carrier material by a suitable treatment, such as impregnation, kneading and extrusion. After deposition of the metal and the promoter on the carrier material, the loaded carrier is typically subjected to calcinations at a temperature of generally from 250 to 750° C., preferably a temperature in the range of from 350 to 550° C. The effect of the calcinations treatment is to remove crystal water, to decompose volatile decomposition products and to convert organic and inorganic compounds to their respective oxides. After calcinations, the resulting catalyst may be activated by contacting the catalyst with hydrogen or a hydrogen-containing gas, typically at temperatures of about 200 to 350° C.

A steady state catalytic hydrocarbon synthesis process may be performed under conventional synthesis conditions known in the art. Typically, the catalytic conversion may be effected at a temperature in the range of from 100 to 600° C., preferably from 150 to 350° C., more preferably from 180 to 270° C. Typical total pressures for the catalytic conversion process are in the range of from 1 to 200 bar absolute, more preferably from 10 to 70 bar absolute. In the catalytic conversion process mainly (at least 70 wt %, preferably 90 wt %) of $C_5+$ hydrocarbons are formed, based on the total weight of hydrocarbonaceous products formed.

In another way, the present invention provides a process for producing normally gaseous, normally liquid and optionally normally solid hydrocarbons from synthesis gas which comprises the steps of:
(i) providing the synthesis gas; and
(ii) catalytically converting the synthesis gas of step (i) at an elevated temperature and pressure to obtain the normally gaseous, normally liquid and optionally normally solid hydrocarbons;

wherein the catalyst for step (ii) is formed from a solid solution of one or more promoters and/or co-catalysts in one or more Group VIII metals, and 90%, preferably 95% of the solid solution is within a standard deviation of 3, 2 or less, preferably within 1, from the mean solid solution value of the elemental weights of the components.

The present invention also provides a process further comprising:
(iii) catalytically hydrocracking higher boiling range paraffinic hydrocarbons produced in step(ii), as well as hydrocarbons whenever provided by a process as described herein.

The present invention also provides use of a catalyst as defined herein in a process for producing normally gaseous, normally liquid and optionally normally solid hydrocarbons from synthesis gas which comprises the steps of:
(i) providing the synthesis gas; and
(ii) catalytically converting the synthesis gas of step (i) at an elevated temperature and pressure to obtain the normally gaseous, normally liquid and optionally normally solid hydrocarbons.

Fischer-Tropsch synthesis is preferably carried out at a temperature in the range from 125-150 to 350° C., more preferably 175 to 275° C., most preferably 180 to 270° C. The pressure preferably ranges from 1-5 to 150-200 bar abs., more preferably from 10 to 70 bar abs.

Preferably, a Fischer-Tropsch catalyst is used, which yields substantial quantities of paraffins, more preferably substantially unbranched paraffins. A part may boil above the boiling point range of the so-called middle distillates, to normally solid hydrocarbons. A most suitable catalyst for this purpose is a cobalt-containing Fischer-Tropsch catalyst. The term "middle distillates", as used herein, is a reference to hydrocarbon mixtures of which the boiling point range corresponds substantially to that of kerosene and gas oil fractions obtained in a conventional atmospheric distillation of crude mineral oil. The boiling point range of middle distillates generally lies within the range of about 150 to about 360° C.

The higher boiling range paraffinic hydrocarbons if present, may be isolated and subjected to a catalytic hydrocracking step, which is known per se in the art, to yield the desired middle distillates. The catalytic hydrocracking is carried out by contacting the paraffinic hydrocarbons at elevated temperature and pressure and in the presence of hydrogen with a catalyst containing one or more metals having hydrogenation activity, and supported on a carrier. Suitable hydrocracking catalysts include catalysts comprising metals selected from Groups VIB and VIII of the (same) Periodic Table of Elements. Preferably, the hydrocracking catalysts contain one or more noble metals from Group VIII. Preferred noble metals are platinum, palladium, rhodium, ruthenium, iridium, and osmium. Most preferred catalysts for use in the hydrocracking stage are those comprising platinum.

The amount of catalytically active metal present in the hydrocracking catalyst may vary within wide limits and is typically in the range of from about 0.05 to about 5 parts by weight per 100 parts by weight of the carrier material. Suitable conditions for the catalytic hydrocracking are known in the art. Typically, the hydrocracking is effected at a temperature in the range of from about 175 to 400° C. Typical hydrogen partial pressures applied in the hydrocracking process are in the range of from 10 to 250 bar.

The process may be operated in a single pass mode ("once through") or in a recycle mode. Slurry bed reactors, ebulliating bed reactors and fixed bed reactors may be used, the fixed bed reactor being the preferred option.

The product of the hydrocarbon synthesis and consequent hydrocracking suitably comprises mainly normally liquid hydrocarbons, beside water and normally gaseous hydrocarbons. By selecting the catalyst and the process conditions in such a way that especially normally liquid hydrocarbons are obtained, the product obtained ("syncrude") may transported in the liquid form or be mixed with any stream of crude oil without creating any problems as to solidification and or crystallization of the mixture. It is observed in this respect that the production of heavy hydrocarbons, comprising large amounts of solid wax, are less suitable for mixing with crude oil while transport in the liquid form has to be done at elevated temperatures, which is less desired. The off gas of the hydrocarbon synthesis may comprise normally gaseous hydrocarbons produced in the synthesis process, nitrogen, unconverted methane and other feedstock hydrocarbons, unconverted carbon monoxide, carbon dioxide, hydrogen and water. The normally gaseous hydrocarbons are suitably $C_{1-5}$ hydrocarbons, preferably $C_{1-4}$ hydrocarbons, more preferably $C_{1-3}$ hydrocarbons. These hydrocarbons, or mixtures thereof, are gaseous at temperatures of 5-30° C. (1 bar), especially at 20° C. (1 bar). Further, oxygenated compounds, e.g. methanol, dimethyl ether, may be present in the off gas. The off gas may be utilized for the production of electrical power, in an expanding/combustion process such as in a gas turbine described herein, or recycled to the process. The energy generated in the process may be used for own use or for export to local customers. Part of an energy could be used for the compression of the oxygen containing gas.

The process as just described may be combined with all possible embodiments as described in this specification.

Steam generated by any start-up gas turbine and/or steam generated in step (i) may also be used to preheat the reactor to be used in step (ii) and/or may be used to create fluidization in the case that a fluidized bed reactor or slurry bubble column is used in step (ii).

Any percentage mentioned in this description is calculated on total weight or volume of the composition, unless indicated differently. When not mentioned, percentages are considered to be weight percentages. Pressures are indicated in bar absolute, unless indicated differently.

EXAMPLES

By way of example only, the following are figures for the manganese variation per single crystal in Co/Mn hydroxide co-precipitate samples. The amount of manganese per crystal is expressed as the weight % of Mn, calculated on the total weight of Co and Mn atoms per single crystal. Samples A, B and C are crystalline solid solutions suitable for use in the current invention. The measurements have been performed using EDX. The average manganese content for samples A, B and C was calculated from the particles analysed. The deviation in manganese content for each particle analysed was calculated as deviation from the average manganese content.

| particle # | m/m Mn/(Co + Mn) Sample A % | m/m Mn/(Co + Mn) Sample B % | m/m Mn/(Co + Mn) Sample C % |
|---|---|---|---|
| 1 | 2.8 | 5.5 | 4.2 |
| 2 | 4.1 | 6.2 | 6.1 |
| 3 | 4 | 6 | 5.8 |
| 4 | 3.6 | 5.4 | 4.6 |
| 5 | 6 | 3.1 | 5.4 |
| 6 | 8.2 | 8.5 | 5.9 |
| 7 | 6.1 | 6.8 | 5 |
| 8 | 4.4 | 4.9 | 6 |
| 9 | 5.9 | 6 | 5.4 |
| 10 | 7.6 | 3.4 | |
| 11 | 3.4 | 6 | |
| 12 | 4.6 | 5.8 | |
| 13 | 13.6 | 4.9 | |
| 14 | 5.1 | 4.7 | |
| 15 | | 4.7 | |
| 16 | | 5.6 | |
| 17 | | 6 | |
| 18 | | 4.6 | |
| 19 | | 5.5 | |
| average | 5.7 | 5.5 | 5.4 |
| st dev | 2.76 | 1.18 | 0.66 |

FIG. 1 of the accompanying drawings shows a comparison between the activation of a prior art cobalt/manganese catalyst material (dashed line) and Sample C as defined above (solid line). The activation is measured in terms of the amount or concentration of water being detected at the reactor outlet, the water being the resultant product as hence indicator of the activation of cobalt oxide (formed from the cobalt hydroxide) as it is converted into the elemental metal.

As can clearly be seen from FIG. 1, the reduction time required for Sample C declines rapidly from about 35 hours, and is wholly or substantially complete at 70 or 75 hours. In contrast, it can be seen that the activation of the prior art catalyst material, whilst also declining from 35 hours or so, declines at a much gentler rate, such that at 70 hours, there is still significant water production occurring therefrom. Indeed, this water production has still not ceased at 95 hours, showing that there is still a percentage of prior art catalyst material to be activated.

It is desired to minimise the reduction time to minimise the creation of such other compounds. Extended reduction time leads to increasing amounts of other compounds being formed in the reduction, such as cobalt titanate and/or over-reduced cobalt metal (being less selective as catalyst), which is undesired.

Moreover, it can be seen that whilst the reduction of Sample C catalyst is finished at 80 hours, and is substantially finished at 70 hours, this is clearly not so for the prior art material. Stopping the reduction of the prior art material at 70 hours leads it to still include a significant percentage of unreduced material, which is again not desired as this can lead to undesired products being formed in the reactor upon use of the catalyst material.

Figure 2:
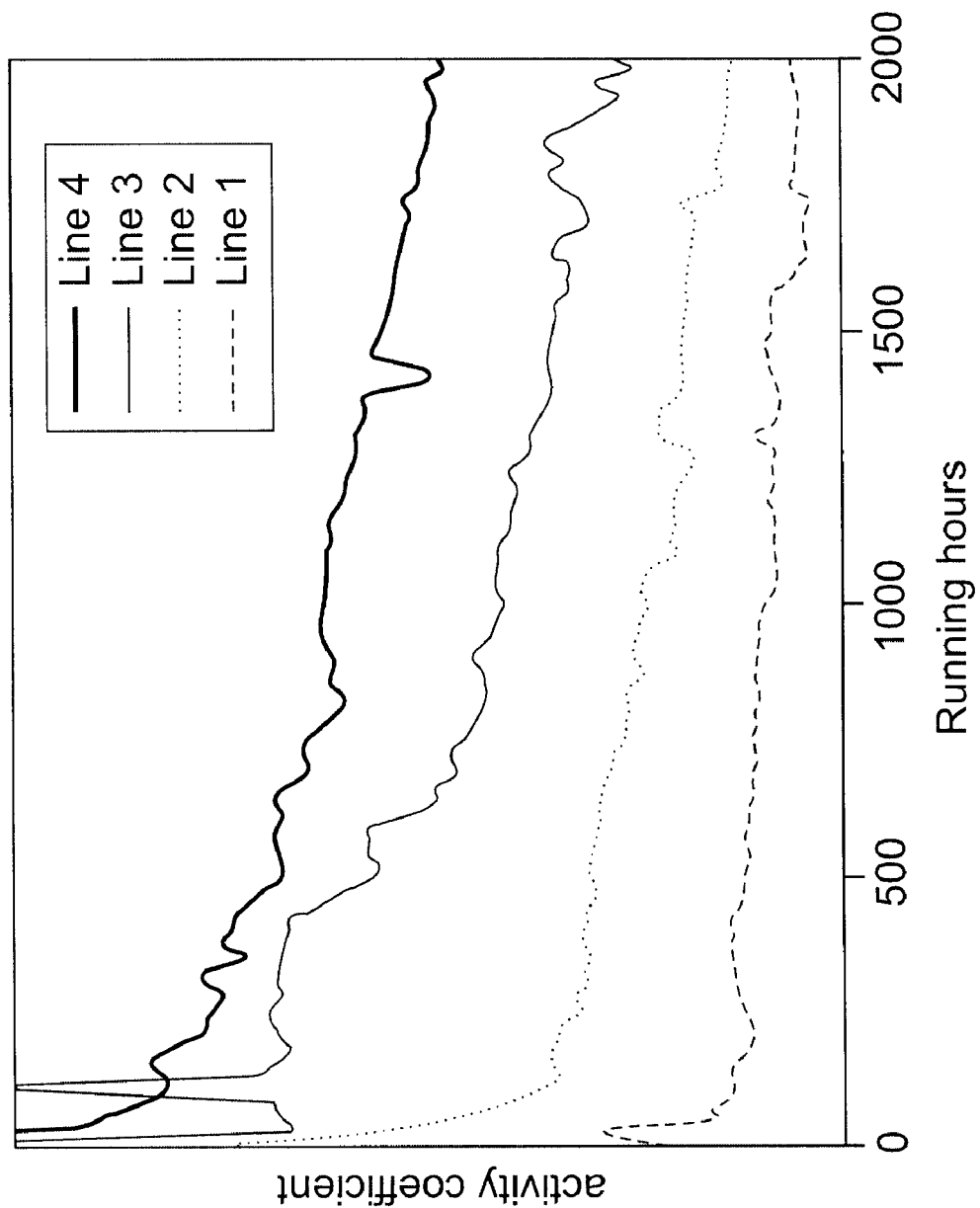
FIG. 2 is a graphical representation of the activity of four different catalysts over time.

FIG. 2 of the accompanying drawings shows catalyst activity in a Fischer-Tropsch reactor of four different catalysts, and is based on activity co-efficient over time under comparable reactor conditions (i.e. based on comparison with a theoretical reference catalyst activity). Line 1 shows activity of a catalyst material not properly reduced, showing its weak activity from the start. Line 2 shows the same catalyst material as used in line 1, following proper reduction under prior art conditions. The improved catalytic activity is clear to see.

Line 3 shows an improved prior art catalyst material following proper reduction. However, line 4 is use of Sample C as defined above under the same reactor conditions. Its catalyst activity is clearly better than any prior art catalyst material, which better activity, once the start-up time is completed, is superior to any of the prior art catalyst materials over the whole running time of the test.

Figure 3:
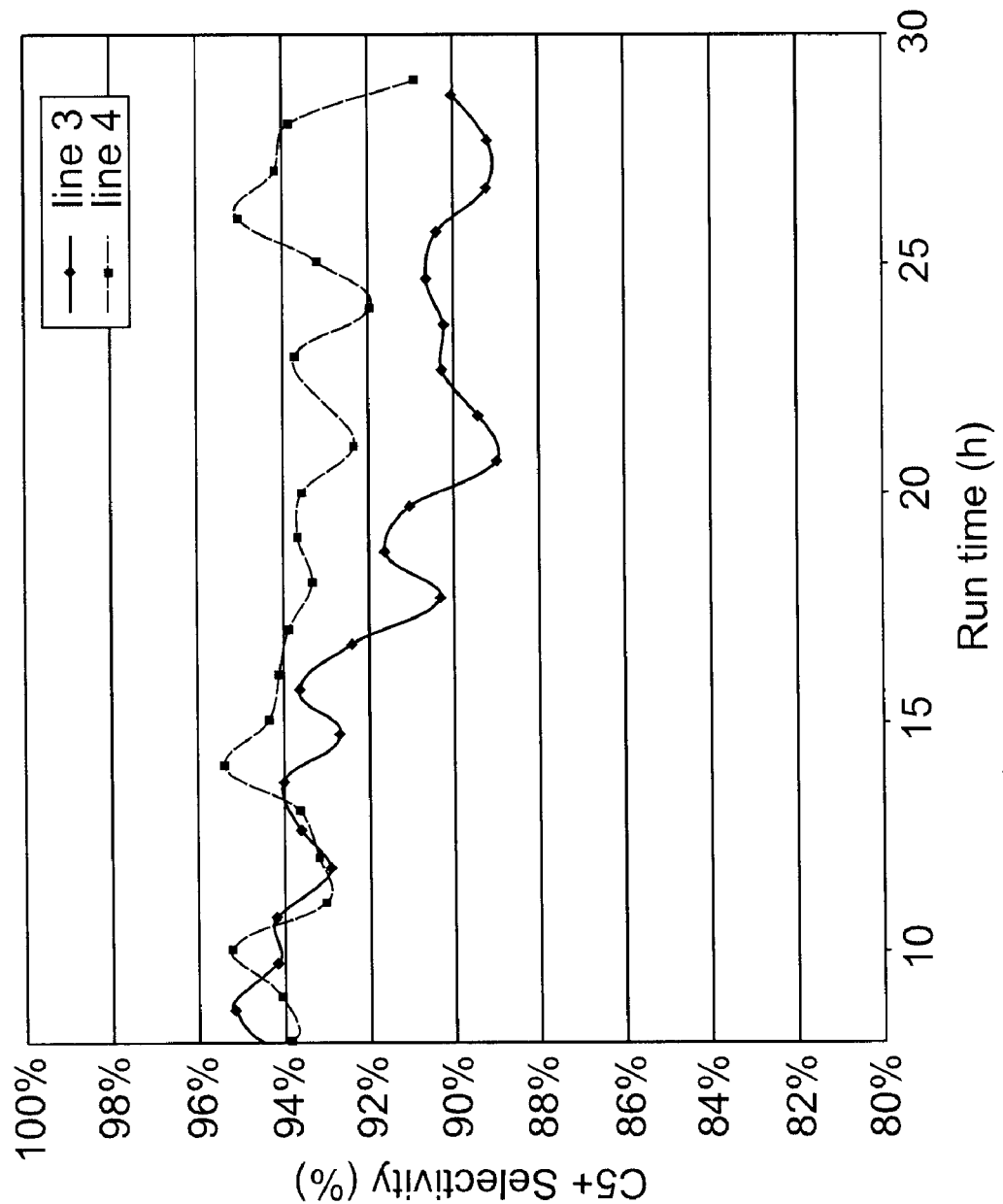
FIG. 3 is a graphical representation of $C_5$+ selectivity of a prior art catalyst and a catalyst according to an embodiment of the invention.

FIG. 3 of the accompanying drawings shows a comparison of the $C_5+$ selectivity of the same materials used in lines 3 and 4 of FIG. 2, in a Fischer-Tropsch reactor over time. As can be clearly seen, line 4, which is the use of Sample C as defined above, shows an improved $C_5+$ selectivity compared with the prior art catalyst material of line 3. That is, Sample C creates less methane and $C_{2-4}$ hydrocarbons, and more useful products which are desired.

The information in the figures confirms that by using a wholly or substantially homogeneous solid solution, with a significant reduction in the variation of the ratio of the components, there are significant increases in the activity and selectivity of the catalyst material under comparable conditions, which, in an industrial scale process, leads to substantially increased output and reduced running costs.

What is claimed is:

1. A method for the preparation of a catalyst or catalyst precursor comprising:
   (a) admixing:
      (i) a carrier material;
      (ii) a crystalline solid solution of a cobalt compound and one or more d-metal compounds;
   (b) forming the mixture of step (a); and
   (c) drying and/or calcining the mixture of step (b),
wherein 90% or more of the crystals in the crystalline solid solution comprises 1 to 10 wt % of a d-metal, calculated on the total weight of d-metal atoms and cobalt atoms per single crystal.

2. The method according to claim 1, wherein the carrier material is a refractory metal oxide or precursor thereof.

3. The method according to claim 1, wherein the d-metal compound is a manganese compound.

4. The method according to claim 1, wherein the solid solution is in the form of a hydroxide, carbonate, acetate, citrate, nitrate, oxyhydroxide or oxide.

5. The method according to claim 4, wherein the solid solution comprises a composition selected from the group consisting of $(Co,Mn)(OH)_2$, $(Co,Mn)(CO_3)$, $(Co,Mn)O(OH)$, $(Co,Mn)O$, and $(Co,Mn)_3O_4$.

6. The method according to claim 4, wherein the solid solution comprises $(Co,Mn)(OH)_2$.

7. The method according to claim 1, wherein the mixture of step (a) is carried out by spray-drying, pressing, and/or extrusion.

8. The method according to claim 1, wherein 90% or more of the crystals in the crystalline solid solution comprise 4 to 6 wt % of d-metal.

9. The method according to claim 1, wherein the admixing step further comprises adding a liquid.

10. The method according to claim 1, wherein the crystalline solid solution further comprises at least one co-catalyst or precursor thereof.

* * * * *